US006445297B1

(12) United States Patent
Nicholson

(10) Patent No.: US 6,445,297 B1
(45) Date of Patent: Sep. 3, 2002

(54) MODULAR RFID ANTENNA SYSTEM

(75) Inventor: Mark R. Nicholson, Scotts Valley, CA (US)

(73) Assignee: Escort Memory Systems, Scotts Valley, CA (US)

( * ) Notice: Subject to any disclaimer, the term of this patent is extended or adjusted under 35 U.S.C. 154(b) by 0 days.

(21) Appl. No.: 09/925,129

(22) Filed: Aug. 8, 2001

Related U.S. Application Data

(60) Provisional application No. 60/239,975, filed on Oct. 10, 2000.

(51) Int. Cl.[7] .............................................. G08B 13/14
(52) U.S. Cl. .................. 340/572.7; 343/893; 340/572.7
(58) Field of Search ................................ 343/702, 893; 340/572.7, 572.1

(56) References Cited

U.S. PATENT DOCUMENTS

| | | | |
|---|---|---|---|
| 5,379,455 A | | 1/1995 | Koschek |
| 5,929,760 A | * | 7/1999 | Monahan .................. 340/572.1 |
| 6,195,053 B1 | * | 2/2001 | Kodukula et al. ...... 235/462.47 |
| 6,218,942 B1 | * | 4/2001 | Vega et al. ............... 340/572.1 |
| 6,335,685 B1 | * | 1/2002 | Schrott et al. ............... 235/385 |
| 6,346,884 B1 | * | 2/2002 | Uozumi et al. ........... 340/572.1 |
| 6,351,215 B2 | * | 2/2002 | Rodgers et al. ........... 340/572.1 |
| 6,362,738 B1 | * | 3/2002 | Vega ......................... 340/10.1 |

\* cited by examiner

Primary Examiner—Don Wong
Assistant Examiner—Shih-Chao Chen
(74) Attorney, Agent, or Firm—Francis Law Group

(57) ABSTRACT

A modular radio frequency identification device (RFID) antenna system including a plurality of modular RFID antenna segments that can be connected in multiple configurations to allow multi-directional RF communication with at least one RF tag that passes through the field of the antenna system from different directions and at different orientations and a configuration system to design, order, configure, test and operate the modular RFID antenna system.

8 Claims, 16 Drawing Sheets

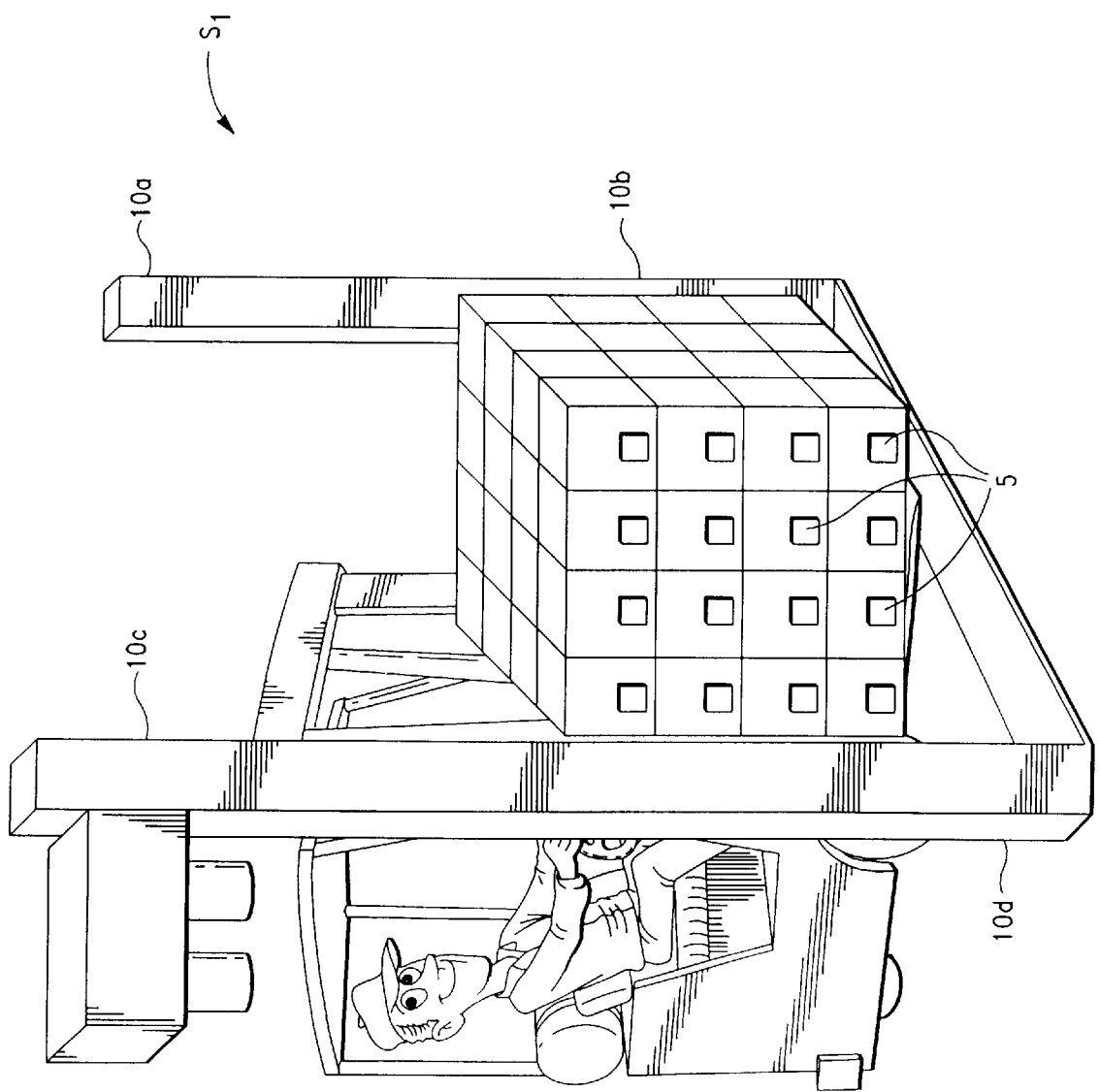

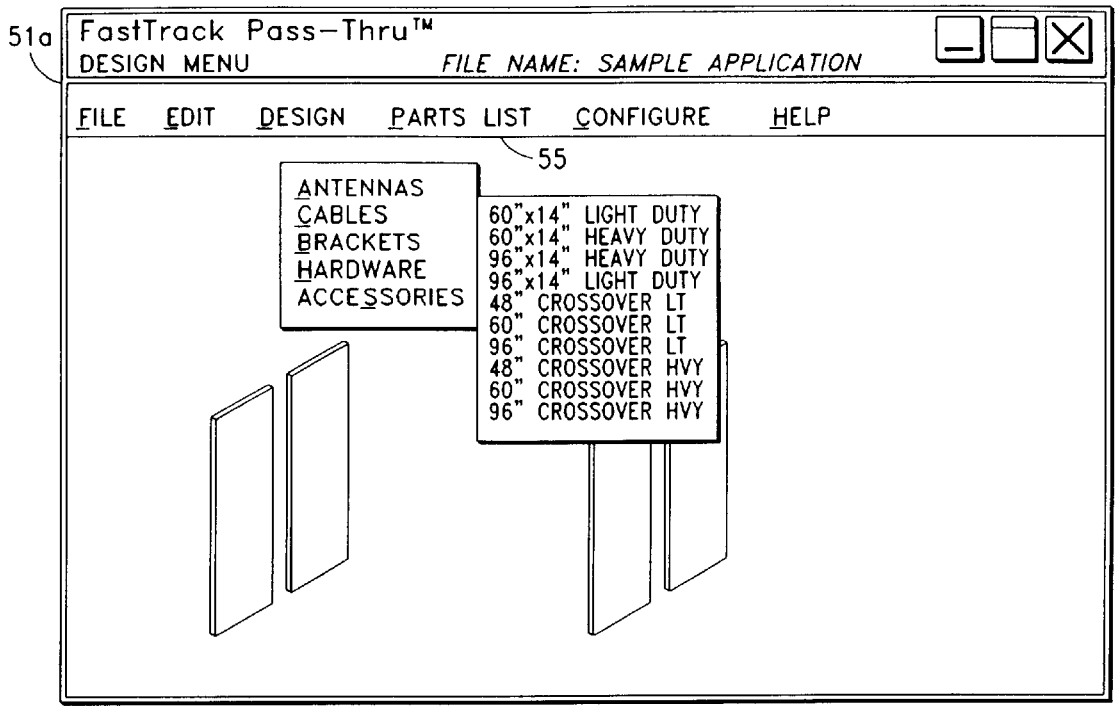
FIG.−16
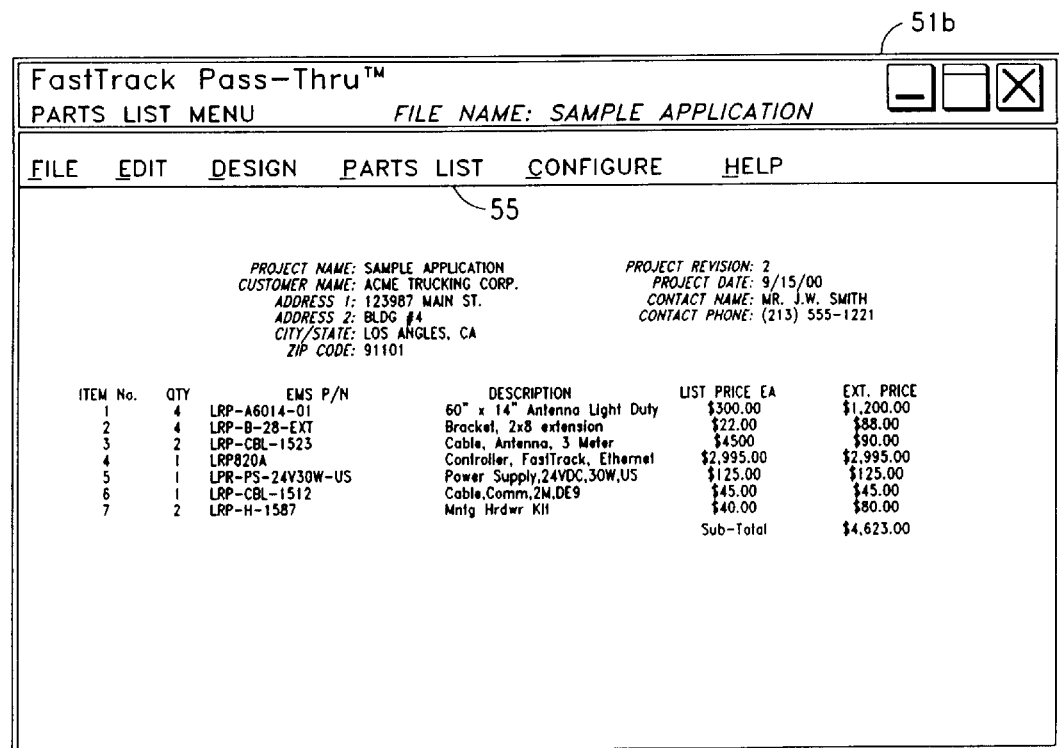
FIG.−17

SET-UP PARAMETERS

| | | | |
|---|---|---|---|
| BAUD RATE | 9600 | 19200 | 38400 |
| INTERFACE | RS232 | RS422 | ETHERNET |
| CONTINUOUS READ | ON | OFF | ETHERNET |
| START ADDRESS | 6 | | |
| READ LENGTH | 6 | | |
| OPERATION MODE | TEST | RUN | |

TEST COMMANDS
VERIFY NO. OF ATTACHED ANTENNA PANELS 
VERFY READ CAPABILITY OF ANTENNA 
VERFY WRITE CAPABILITY OF ANTENNA 
VERIFY READ SPEED OF ANTENNA 
VERIFY WRITE SPEED OF ANTENNA 
*FIG.−20*

MODULAR RFID ANTENNA SYSTEM

This application claims benefit of provisional application No. 60/239,975 filed Oct. 10, 2000.

FIELD OF THE PRESENT INVENTION

The present invention relates generally to radio frequency identification (RFID) systems. More particularly, the invention relates to a modular RFID antenna and configuration system.

BACKGROUND OF THE INVENTION

RFID systems are well known in the art. Such systems include relatively large packages containing battery powered transmission/receiving circuitry, such as the identification system disclosed in U.S. Pat. No. 4,274,083, to passive systems in which the transponder receives its power from the base station or interrogator, such as the identification system disclosed in U.S. Pat. No. 4,654,658.

A typical RFID system is made up of reusable tags fixed to or embedded in product carriers, an antenna system that interrogates the tags via an RF link and a controller. The host (or computer) system interfaces with the controller and directs the interrogation of the tags.

The RFID system thus provides effective means of identifying, monitoring, and controlling materials in a closed loop process. In a factory environment, the tags are employed as the transport mechanism between "islands of automation," providing a record of each process which can be acted upon immediately or downloaded later for analysis.

In operation, as a tag passes near an RFID antenna unit, an antenna emits RF signals towards the tag. The emitted RF signals induce a current in the tag. The current powers-up the tag, thereby enabling the tag to transmit response signals from the tag to the antenna unit.

The tags can also be powered by an internal battery (i.e., an "active" tag). The life span of an active tag is, however, generally limited by the lifetime of the battery.

RFID antenna units are typically placed on gate like structures in manufacturing environments and are used to read tagged items as they passed through. The antennas are generally operated in the ranges of 2.45 GHz, 900 MHz or 125 KHz. The noted frequencies are employed to achieve a longer antenna field range.

It is, however, well known that at 2.45 GHz and 900 MHz the fields produced by the antenna(s) are affected by virtually everything that passes through the field, including metals and moisture. Metal causes extreme reflection of the fields, while moisture causes extreme absorption of the field. Therefore, any metal object or anything containing moisture, such as the human body, will cause extreme disruption of the field and, hence, the communication of the antenna with the tags.

In an effort to eliminate or substantially reduce the extreme reflection cause by metal objects passing through the field, multiple reflective shields have been employed. The shields cause the field to continuously reflect until it eventually contacts a tag. This is, however, a costly and often impractical solution.

At the other extreme (i.e., 125 KHz), better environmental performance is achieved because metal and moisture generally have less affect on the field. There are, however, several significant drawbacks associated with the noted operating frequency. A major drawback is the high cost, since 100 or more turns in the antenna coil are required to achieve the 125 KHz operating range.

Alternatively, an operating frequency of 13.56 MHz can be employed. Although the noted frequency achieves good environmental performance, it is often unable to achieve the operating range of the aforementioned frequencies.

It is therefore an object of the present invention to provide an RFID antenna system that utilizes modular antenna segments that can be connected in a variety of configurations for multiple applications.

SUMMARY OF THE INVENTION

In accordance with the above objects and those that will be mentioned and will become apparent below, the modular RFID antenna system in accordance with this invention comprises modular RFID antenna segments that can be connected in multiple configurations to allow multi-directional (i.e., omni-directional) RF communication to at least one transponder or tag located on one or more items that pass through the field of the antenna system. The modular RFID antenna system further includes a configuration system that allows the user to customize, order, configure, test and operate a modular RFID antenna system for a particular application.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which:

FIG. 1 is a schematic illustration of one embodiment of the modular RFID antenna system according to the invention;

FIGS. 16–18 are schematic illustrations of various embodiments of the configuration system menus according to the invention;

FIG. 19 is a schematic illustration of the configuration system set-up parameters according to the invention; and FIG. 20 is a schematic illustration of the configuration system test commands according to the invention.

DETAILED DESCRIPTION OF THE INVENTION

The modular radio frequency identification device (RFID) antenna system of the present invention substantially reduces or eliminates the disadvantages and shortcomings associated with prior art RFID antenna systems. According to the invention, the modular RFID antenna system comprises a plurality of easy-to-assemble modular RFID antenna segments that can be connected in multiple configurations to allow omni-directional communication with at least one transponder or tag located on one or more items that pass through the field of the antenna system. The modular RFID antenna system further includes a configuration system (i.e., computer system) that allows the user to design, order, configure, test and operate a modular RFID antenna system for a particular application.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Referring first to FIG. 1, there is shown one embodiment of an assembled RFID antenna system $S_1$, according to the invention. As illustrated in FIG. 1, the system $S_1$ comprises a plurality of modular antenna segments or panels 10a–10d that are connected in a desired configuration to allow omni-directional communication with tags 5 located on multiple items or containers 7 that pass through the field of the antenna system $S_1$.

Referring now to FIGS. 2A–2K, there are show various embodiments of modular RFID antenna panels (or segments) and components that are preferably employed to construct various RFID antenna system configurations. According to the invention, the panels 12, 14, 16, 18, 20, 22, 24 can comprise various lengths, widths and thicknesses to facilitate a variety of "pass-thru" configurations and, hence, applications. As discussed in detail herein, each panel 12, 14, 16, 18, 20, 22, 24 is adapted to transmit and receive at least one RF signal from at least one RF tag.

In a preferred embodiment of the invention, the panels are substantially rectilinear in shape and have a length in the range of 6 to 240 in., a width in the range of 0.125 to 66 in., and a thickness in the range of 0.0625 to 24 in.

Figure 2A:
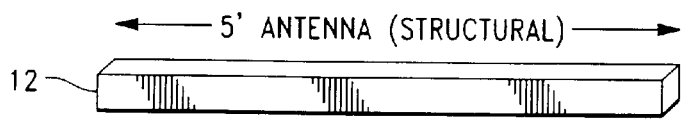
FIGS. 2A–2C are plan views of various embodiments of modular antenna panels according to the invention.
Figure 2B:
Figure 2C:
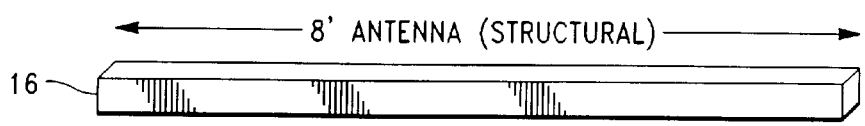

Referring now to FIGS. 2A and 2B, there are shown 5 ft. structural 12 and low-profile 14 panels. According to the invention, the low-profile panel 14 can be employed as a ground segment of a "pass-thru" antenna system, such as system $S_2$ illustrated in FIG. 6.

As illustrated in FIGS. 2A–2C and 2G, the low-profile and structural panels can be employed in multiple lengths (e.g., 8 ft.). As indicated, the length of a respective panel can range up to 240 in.

Figure 2D:
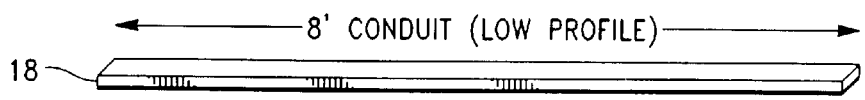
FIGS. 2D–2F are plan views of two embodiments of RFID antenna system conduits according to the invention.
Figure 2E:
Figure 2F:
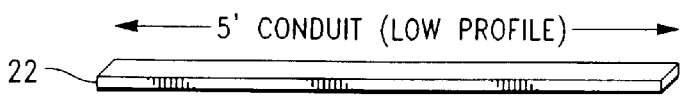
Figure 2G:
FIG. 2G is a plan view of a further embodiment of a low profile modular antenna panel according to the invention.
Figure 2H:
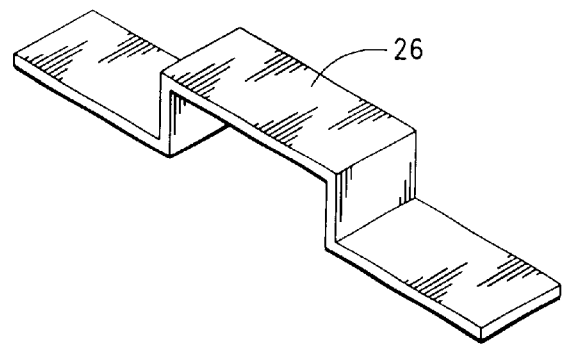
FIG. 2H is a perspective view of one embodiment of an antenna panel support device according to the invention.
Figure 2I:
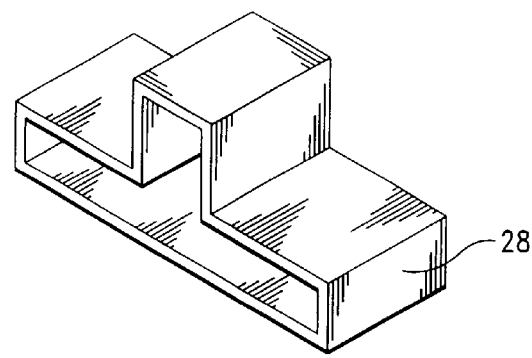
FIG. 2I is a perspective view of an antenna panel connector according to the invention.
Figure 2J:
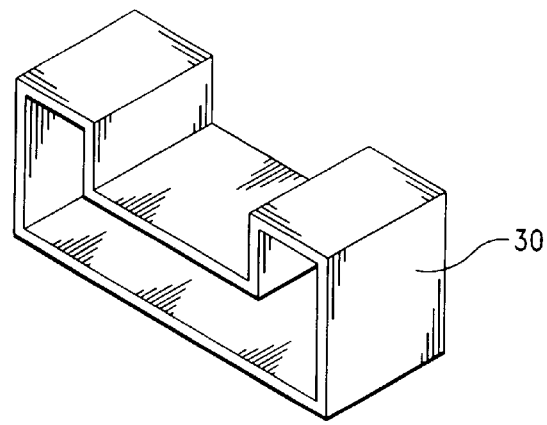
FIG. 2J is a perspective view of an antenna panel end cap according to the invention.

Referring now to FIGS. 2D–2F, the antenna system preferably includes conduits 18, 20, 22 of various sizes and configurations. The system further includes multiple components such as the support 26, connector 28 and end cap 30 shown in FIGS. 2H–2J to facilitate multiple set-ups and/or applications.

Figure 2K:
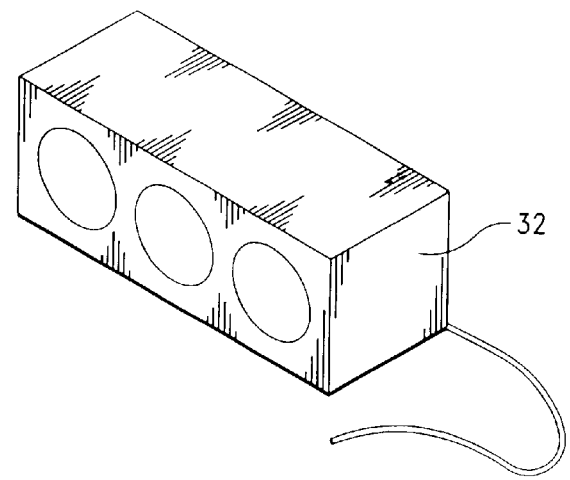
FIG. 2k is a perspective view of a controller according to the invention.

A key component of the antenna system is the controller 32 shown in FIG. 2K. As discussed in detail below, the controller 32 is operatively connected to the desired antenna system configuration and is adapted to control the operation of the panels (see FIG. 6).

Figure 3C:
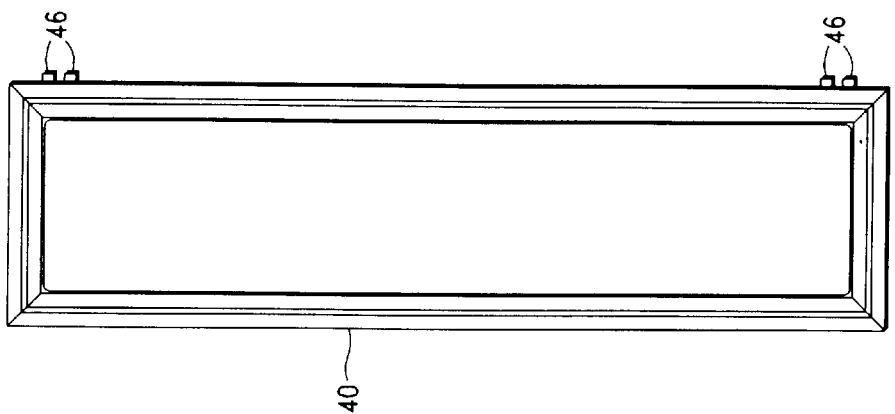
FIGS. 3B and 3C are plan views of the antenna panel shown in FIG. 3A according to the invention.
Figure 3B:
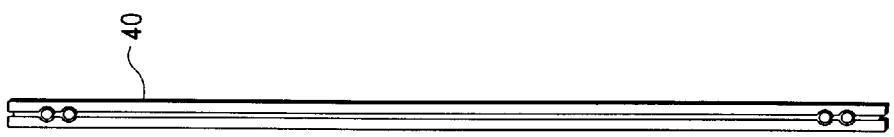
Figure 3A:
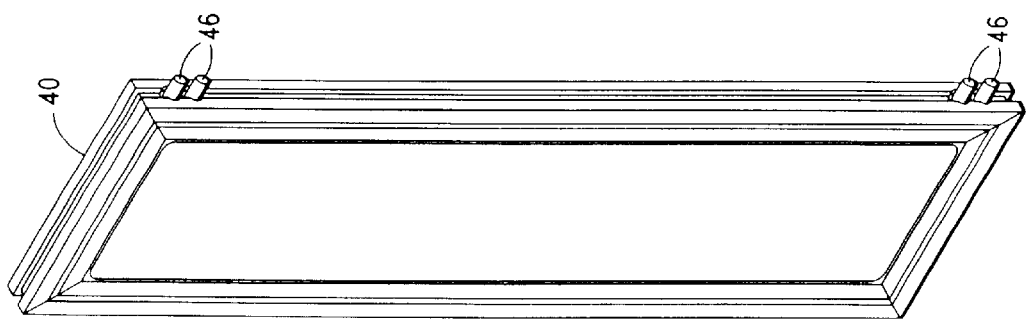
FIG. 3A is a perspective view of a further embodiment of an antenna panel according to the invention.

Referring now to FIGS. 3A–3C, there is shown a preferred low-profile antenna panel 40, according to the invention. The panel 40 preferably has a substantially rectangular shape and a length in the range of 58–62 in., a width in the range of 13–17 in., and a thickness in the range of 1.0–1.5 in.

Figure 4:
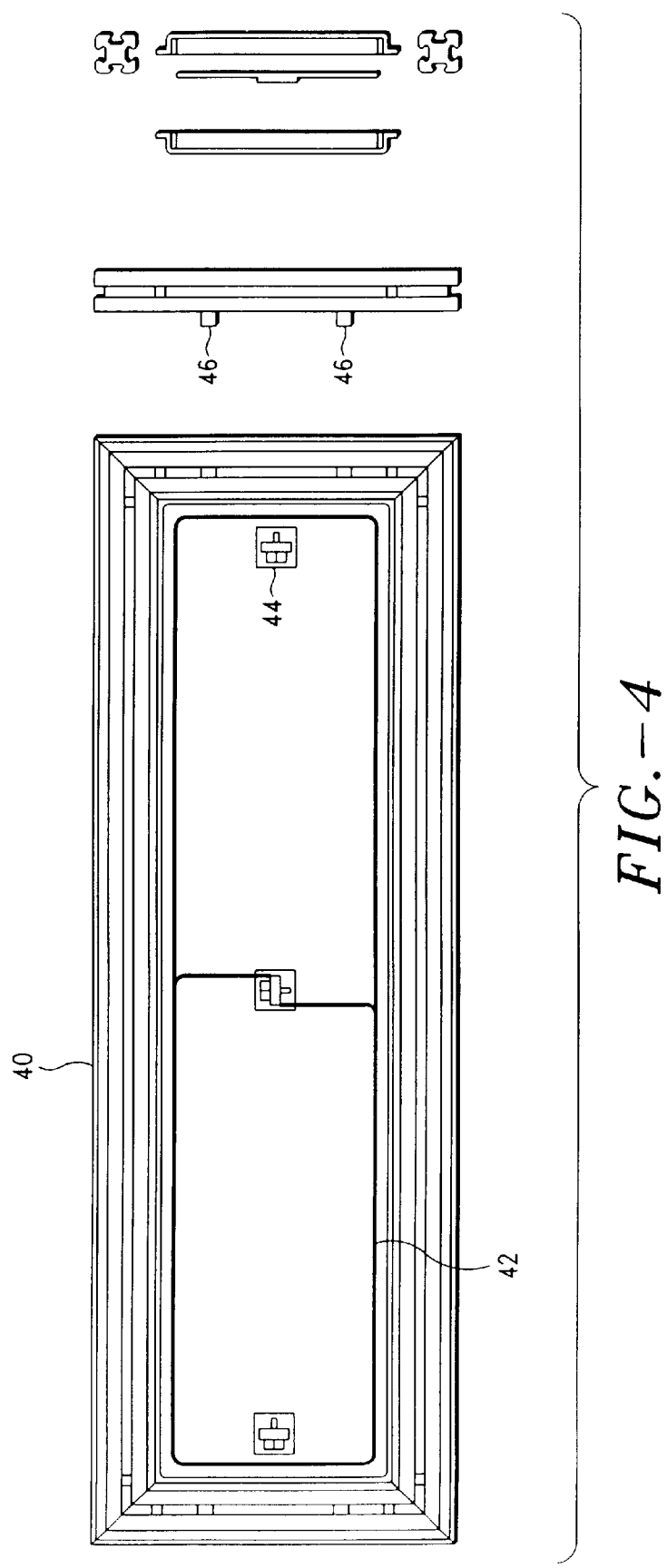
FIG. 4 is a sectional view of the panel shown in FIG. 3A, illustrating the placement of the antenna loop according to the invention.

Referring to FIG. 4, the antenna panel 40 includes an antenna wiring loop 42, at least one tuning board 44. The antenna panel 40 further includes a plurality of RF connectors 46 (see FIG. 3A). As will be appreciated by one having ordinary skill in the arts, various antenna 42 configurations and placements may be employed within the scope of the invention.

Figure 5:
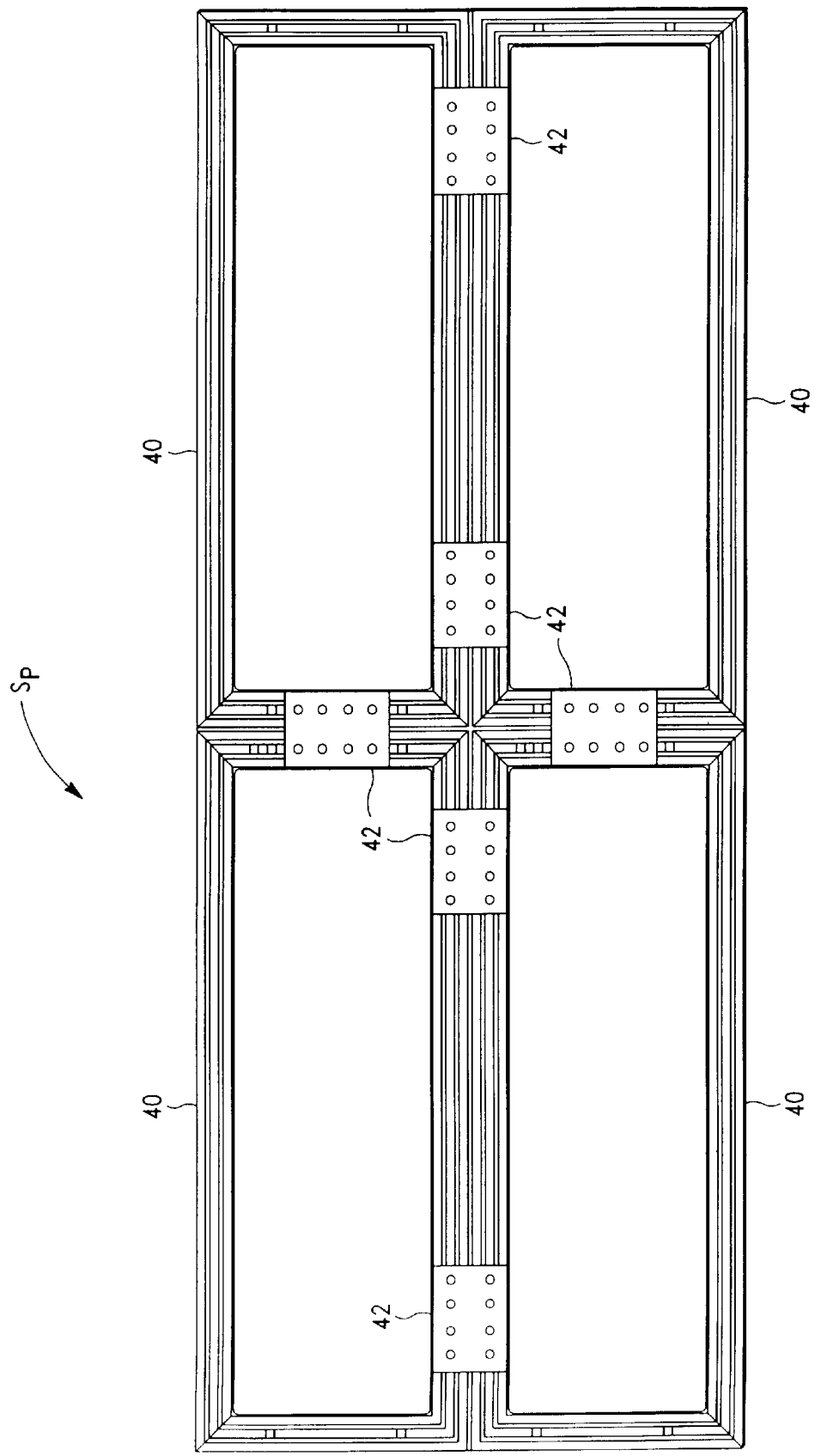
FIG. 5 is a plan view of a planar RFID antenna system according to the invention.

As illustrated in FIG. 5, the panels 40 can be employed to construct a substantially planar antenna system $S_P$ that can be employed in a variety of applications. The panels 40 are preferably connected proximate the edges and secured in the desired position by conventional means. In a preferred embodiment, the panels 40 are secured by a plurality of planar connectors 42.

Figure 6:
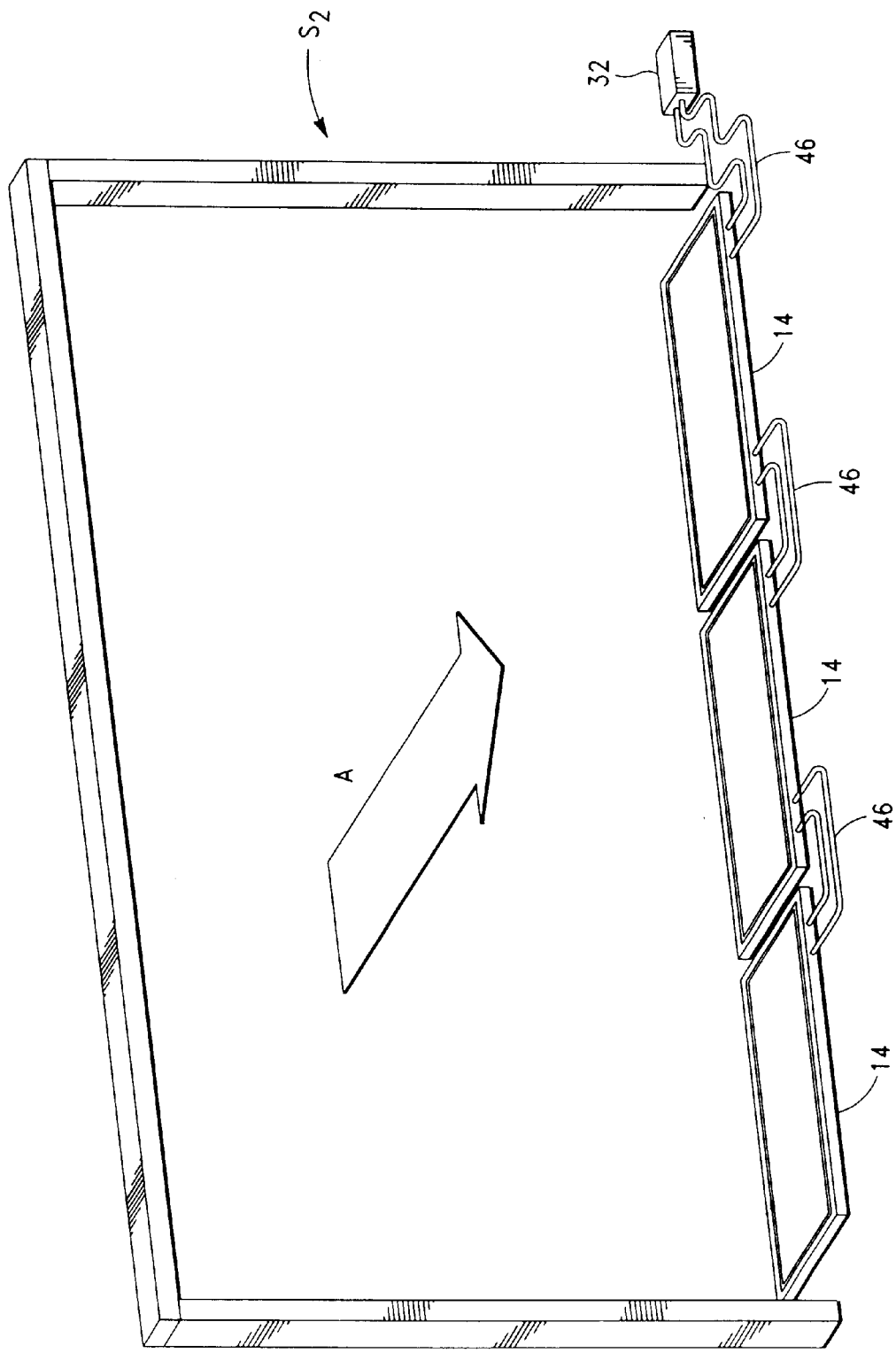
FIGS. 6–10 are schematic illustrations of additional embodiments of RFID antenna systems according to the invention.

Referring now to FIGS. 6–10, there are shown further embodiments of RFID antenna system configurations, according to the invention. Referring first to FIG. 6, there is shown a preferred ground or floor "pass-thru" antenna system $S_2$. The system preferably includes a plurality of low-profile panels (14 or 40) disposed proximate the floor or ground of the structure (or building). The panels 40 are preferably in communication with each other via cable system 46. However, in this and other referenced embodiments herein, the panels 40 can be employed separately. A controller 32 is also included to control the operation of the panels 40.

Figure 7:
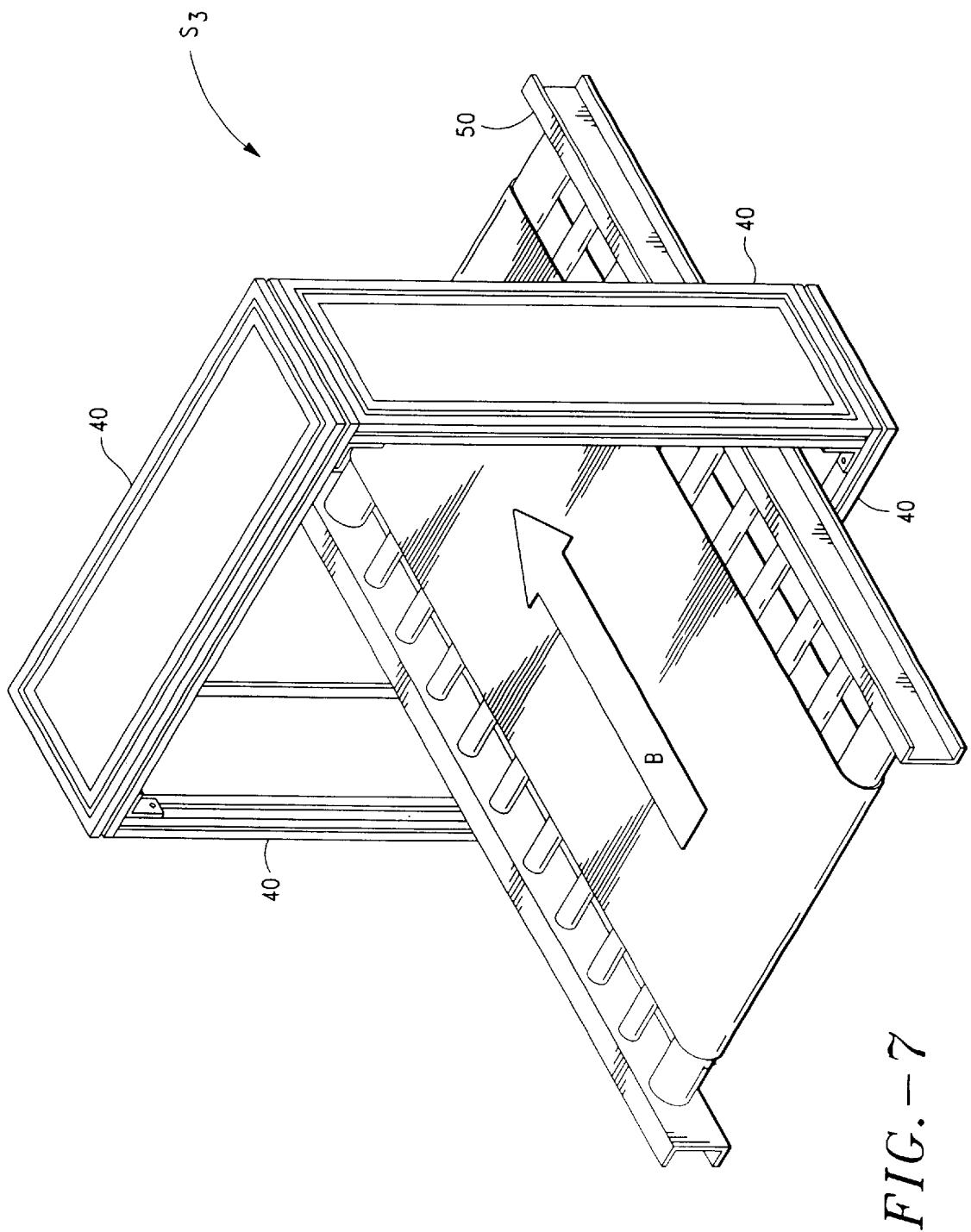

Referring now to FIG. 7, there is shown one embodiment of a conveyor "pass-thru" antenna system $S_3$. As illustrated in FIG. 7, the "gate" system $S_3$ facilitates effective RF communication by and between the inter-connected antenna panels 40 and one or more tags that pass through the antenna field (via conveyor 50) in the direction denoted by Arrow B.

Figure 8:
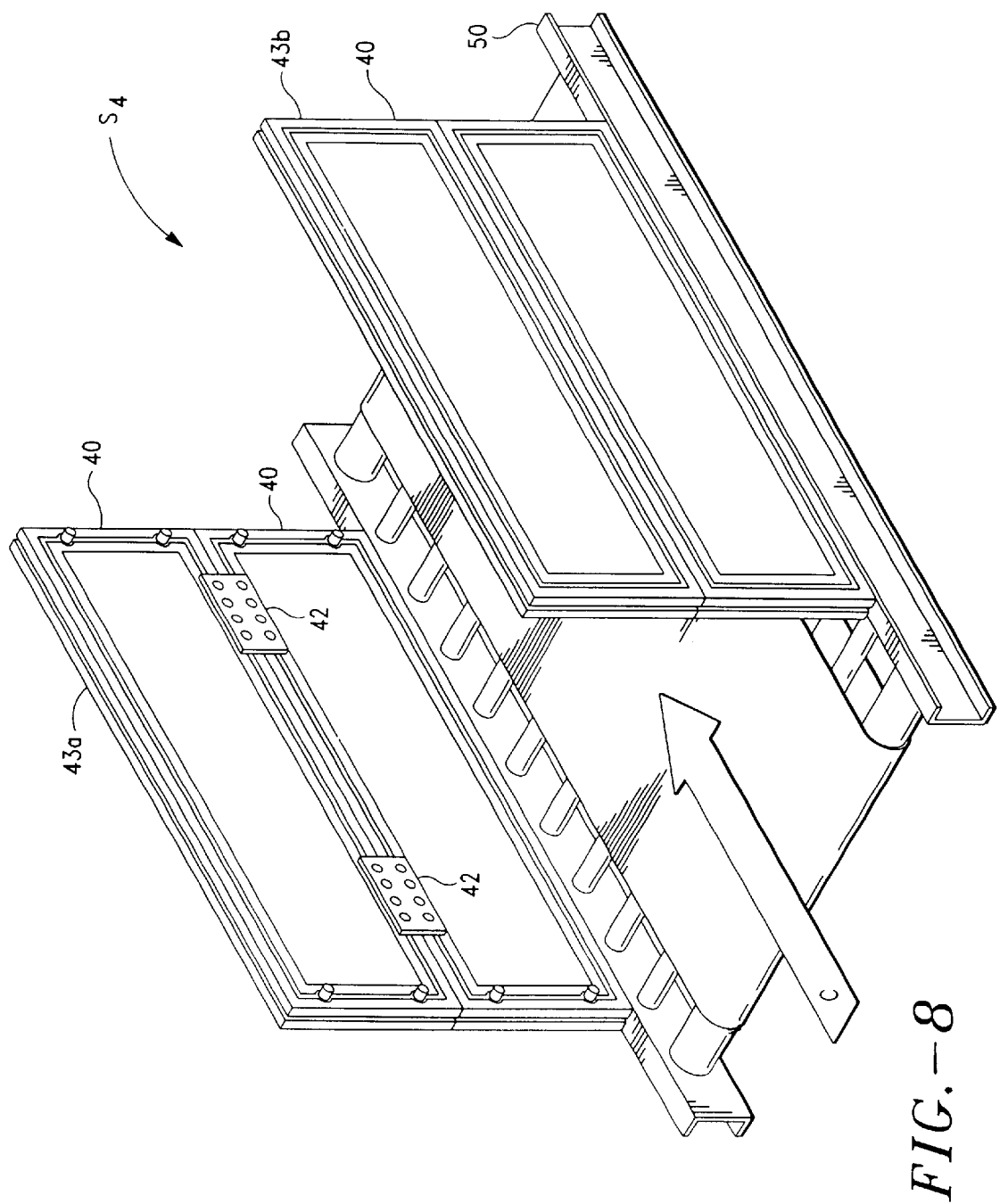

Referring now to FIG. 8, there is shown a further conveyor "pass-thru" system $S_4$. In this embodiment, two planar panel segments 43a, 43b, each segment having at least two inter-connected panels 40, are employed.

The panel segments 43a, 43b are preferably disposed on opposing sides of a conveyor 50. According to the invention, the system $S_4$ provides highly effective RF communication by and between the panels 40 and one or more tags passing through the antenna field in the direction denoted by Arrow C.

Figure 9:
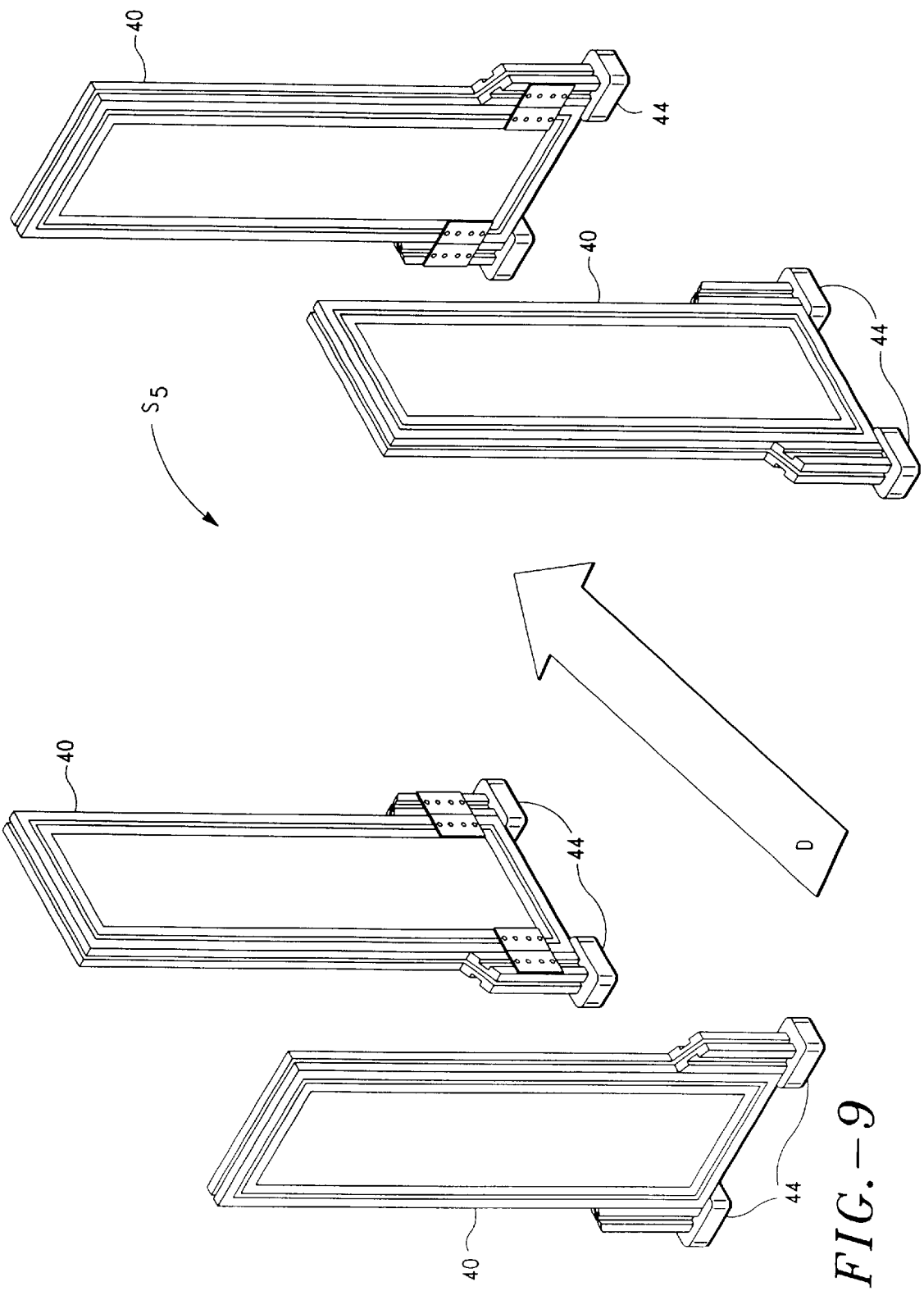
Figure 10:
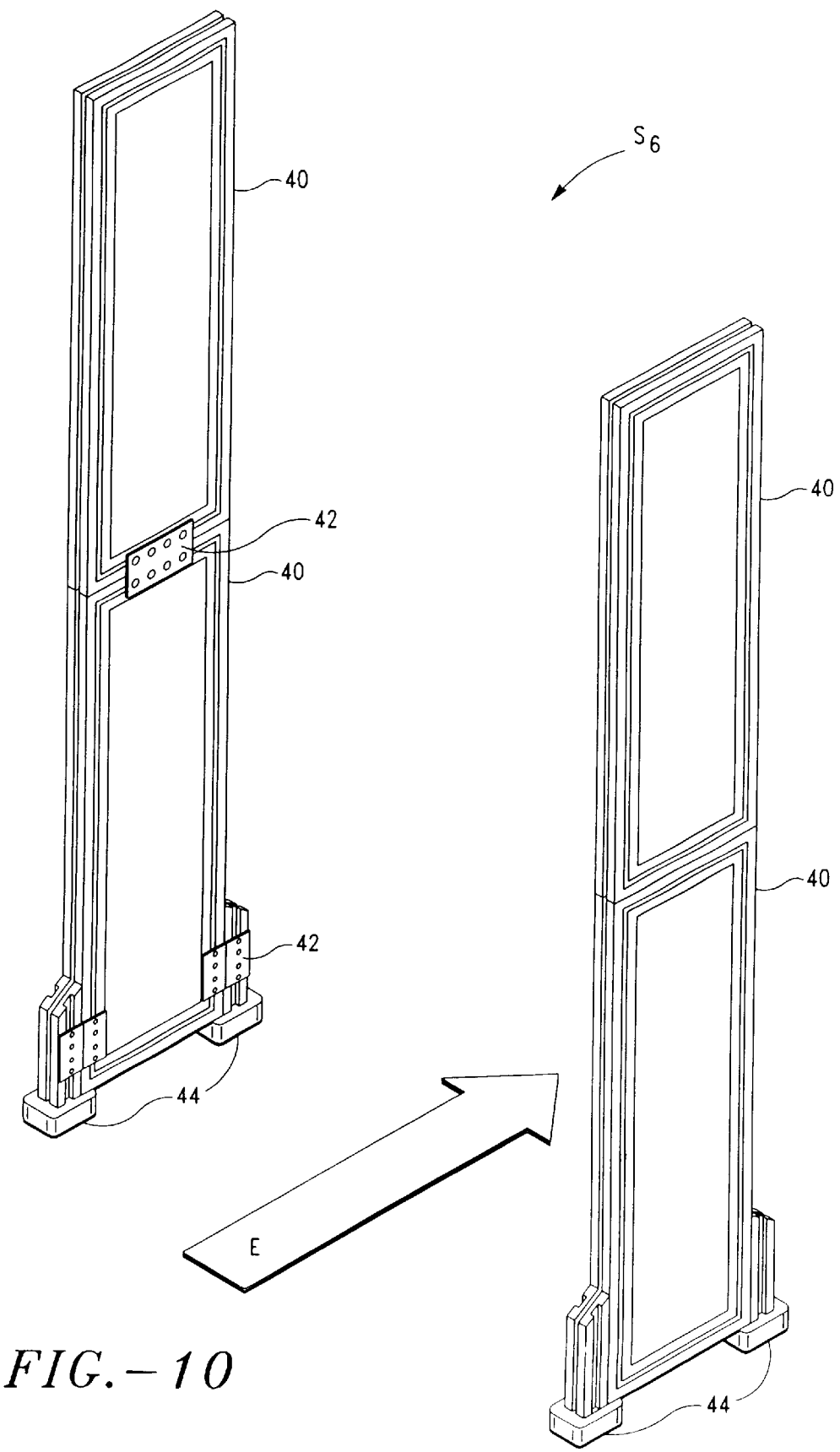

Referring now to FIGS. 9 and 10, there are shown additional "pass-thru" antenna systems $S_5$, $S_6$. Referring first to FIG. 9, the system $S_5$ includes a plurality of low-profile panels 40 that are disposed in an upright position. The panels 40 are secured in the upright position and desired locations via supports 44.

As will be appreciated by one having ordinary skill in the art, the system $S_5$ can be readily adapted to facilitate multiple paths (i.e., direction, width, etc.) through the antenna field(s), such as the path denoted by Arrow D. The system $S_5$ can further be adapted to provide highly effective, omni-directional RF communication by and between the panels 40 and one or more tags within the antenna field(s).

Referring now FIG. 10, there is shown a "stacked" panel system $S_6$. The "stacked" panel system can similarly be adapted to facilitate multiple paths through the antenna fields.

To increase the read/write operating range of a RFID modular antenna system or configuration, the present invention includes novel antenna-switching circuitry that allows adequate tag coverage at an increased range, while maintaining the radiation limits within those imposed by the FCC/CE. According to the invention, the driven antenna panels (e.g., 40) are switched on and off in an inverted manner at a rate that accommodates complete RF communication between the antenna panels and tags, while at the same time allowing for averaging or quasi-peak detection as allowed by the FCC/CE.

To achieve successful communication between a respective antenna panel and the tags, the transmitting antenna panel preferably continuously powers the passive tags. Once the tag is powered, a transmitter modulates the very field that powers the tag. The tag then communicates with the receiver via a separate receiving antenna while remaining powered by the transmit antenna.

A key element of the present invention is the configuration system or software component that provides the user with a PC—Windows® based interface for design and configuration of a desired modular RFID antenna system.

Figure 11:
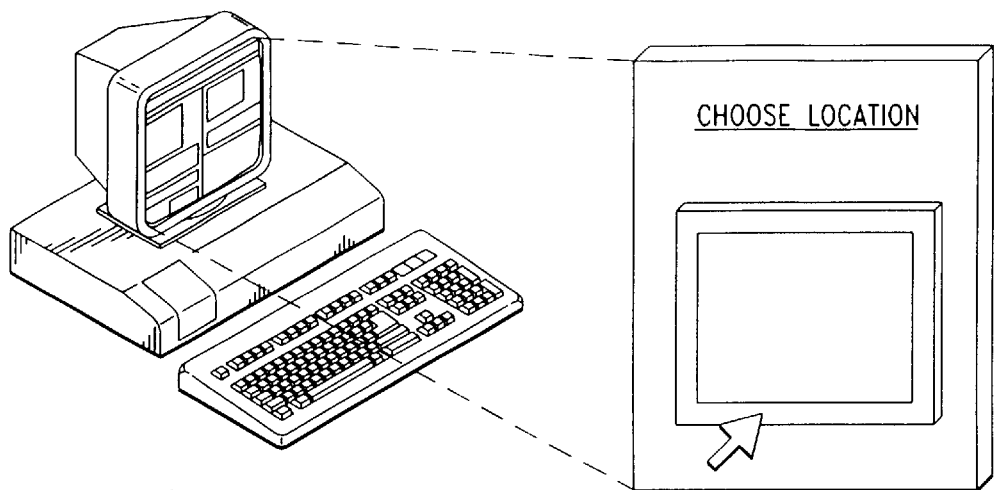
FIGS. 11–13 are schematic illustrations of the PC based configuration system according to the invention.
Figure 12:
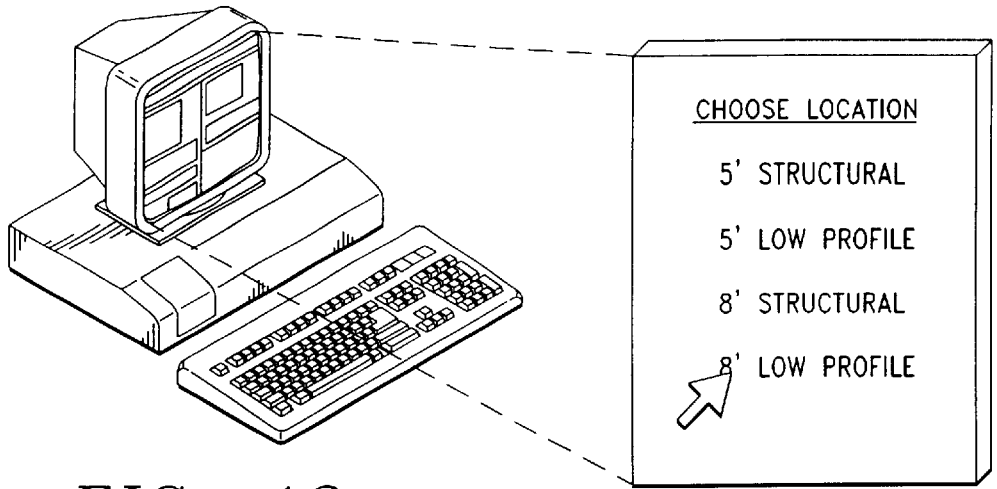
Figure 13:
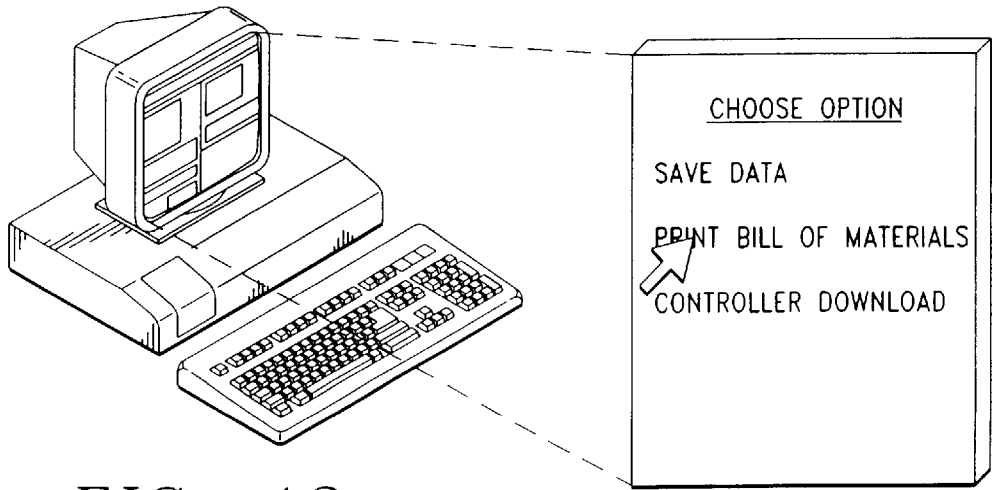

As illustrated in FIGS. 11–13 and discussed in detail below, the software component of the RFID antenna system provides the user with a plurality of options, including antenna system location and parameters related thereto (FIG. 11), panel configuration and size(s) (FIG. 12) and data control, such as preparation and printing of a bill of materials (FIG. 13).

Figure 14:
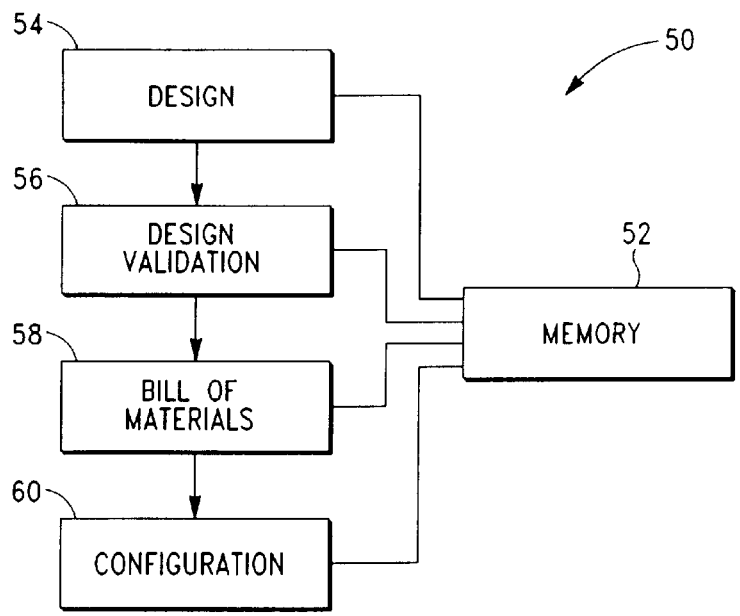
FIGS. 14–15 are schematic illustrations of the configuration system modules according to the invention.

Referring now to FIG. 14, the software component 50 preferably includes the following sub-systems or modules: memory 52, design 54, design validation 56, bill of materials 58, and configuration 60. Each sub-system 52, 54, 56, 58, 60 is discussed in detail below.

Memory

As illustrated in FIG. 14, each of the sub-systems 54, 56, 58, 60 is preferably in communication with the memory module or sub-system 52. According to the invention, the memory sub-system 52, includes at least the following databases or information: a plurality of available modular antenna systems (e.g., see FIGS. 6–10), mechanical elements or parts for each antenna system (see FIGS. 2A–2J), and set-up and operation parameters (See FIGS. 19 and 20).

Design

According to the invention, the design sub-system 54 allows the user to select one or more of a plurality of available modular antenna systems. Such systems include systems $S_1$–$S_6$ shown FIGS. 1, 6–10.

After the desired sub-system is selected, the design sub-system 54 then provides the user with a design menu 51a (see FIG. 16). The design menu 51a includes a parts list prompt 55 that links the user to a parts list menu 51b that provides list of mechanical elements or parts that are comparable with the selected system (see FIG. 17).

As discussed in detail below, the design sub-system 64 further includes means for generating drawings.

Design Validation

According to the invention, the design validation sub-system 56 includes means for validating the selected antenna system and mechanical elements.

In a preferred embodiment of the invention, if one or more of the selected mechanical elements are incorrect and/or incomparable with the selected antenna system, the design validation sub-system 56 will provide an error message and details relating thereto. The design validation sub-system 56 will further restrict the user from printing a bill of materials.

Bill of Materials

According to the invention, the bill of materials sub-system 58 includes means for generating a bill of materials. The bill of materials is preferably in tabular form and, as discussed in detail below, includes at least the following fields: line item fields, including supplier part number, part description, quantity, unit price and extended price; and global item fields, including customer name, address and other identifier information and (e.g., customer number), project name, P.O. number, shipping information and special instructions.

The noted information is preferably provided in a printable format that can, if desired, be attached as an addendum to a purchase order.

In an additional envisioned embodiment of the invention, the bill of materials sub-system 58 also provides a bill of materials that is exportable via electronic media in formats that are compatible with the user's (or customer's) and supplier's (or vendor's) purchasing/receiving systems. As will be appreciated by one having ordinary skill in the art, the noted feature would facilitate E-commerce data/information transmission.

Configuration

A key sub-system of the software component is the configuration sub-system 60. According to the invention, the configuration sub-system 60 includes means for assembly, configuration and control of the antenna system.

Figure 15:
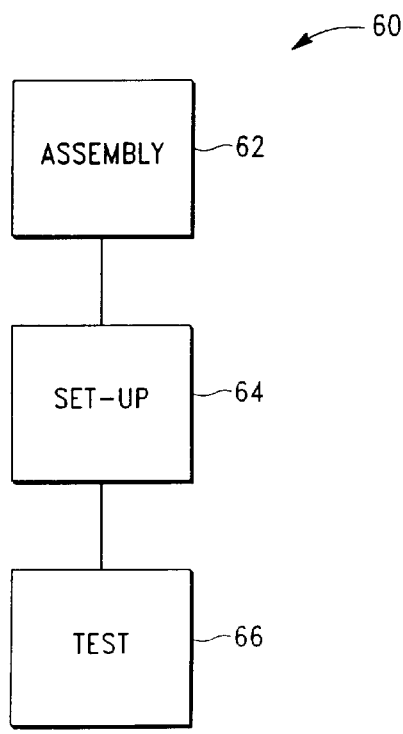

As illustrated in FIG. 15, the configuration sub-system 60 includes at least three (3) components: assembly 62, set-up 64 and test 66. The noted sub-systems 62, 64, 66 are similarly accessible via a configuration menu 51c (see FIG. 18).

Assembly

According to the invention, the assembly component 62 includes means for generating installation assembly drawings. The drawings can be selected automatically or manually from a set of predefined drawings (stored in memory module 52).

The drawings are preferably provided in a format that is displayable and printable by the user. The files are also exportable in Auto CAD formats.

Set-Up

Figures 18, 19:
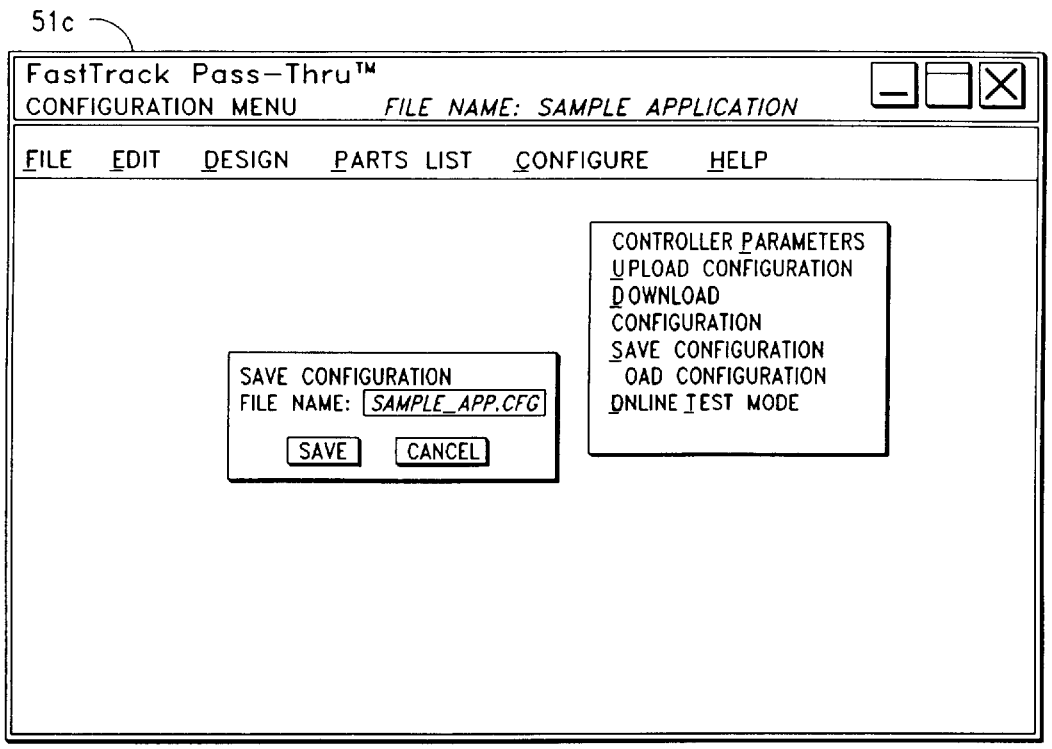

The set-up component 64 provides the user with the necessary RF communication parameters. Referring to FIG. 19, the set-up component thus includes at least the following: a plurality of baud rates, interface options (e.g., hardware protocols), operation mode (e.g., test or run) and read parameters (e.g., continuous, non-continuous, start address, etc.).

Test

The test component 66 includes means for testing the assembled antenna system. Referring to FIG. 20, the test component 66 preferably provides a plurality of commands to verify the presence and operation health of a respective one and/or a plurality of the antenna panels.

The foregoing descriptions of specific embodiments of the present invention have been presented for the purposes of illustration and description. They are not intended to be exhaustive or to limit the invention to the precise forms disclosed. Without departing from the spirit and scope of this invention, one of ordinary skill can make various changes and modifications to the invention to adapt it to various forms of usage and conditions. As such, these changes and modifications are properly, equitably, and intended to be, within the full range of equivalence of the following claims.

What is claimed is:

1. A modular RFID antenna system, comprising;

a plurality of modular antenna segments, each of said plurality of antenna segments adapted to transmit and receive at least one RF signal from at least one RF tag, said antenna segments being removably connectable to form a plurality of antenna system configurations, at least a first of said plurality of antenna system configurations providing a first antenna field, said first antenna field providing substantially multi-directional RF transmission and receipt of said RF signal.

2. The modular antenna system of claim 1, wherein said antenna system includes configuration means, said configuration means including design means for designing at least a first one of said plurality of antenna system configurations, design validation means to validate said design of said first antenna system configuration, and configuration means for providing at least one assembly drawing and the control parameters for said first antenna system configuration, said configuration means including control means for controlling the operation of said first antenna system configuration after assembly.

3. The modular antenna system of claim 2, wherein said configuration means further includes test means for testing said assembled first antenna system configuration.

4. The modular antenna system of claim 2, wherein said configuration means includes memory means for storing at least a plurality of different said antenna segments, said plurality of antenna system configurations, and control parameters for said plurality of antenna system configurations.

5. A configuration system for a modular RFID antenna system, said antenna system including a plurality of antenna segments assembled to form an antenna system configuration, comprising;

design means for designing said antenna system configuration, said design means including means for selecting said plurality of antenna segments;

design validation means to validate said design of said antenna system configuration; and configuration means for providing at least one assembly drawing for said antenna system configuration and the control parameters for said RFID antenna system, said configuration means including test means for testing said RFID antenna system, control means for controlling the operation of said RFID antenna system, and memory means for storing at least the control parameters for said control of said antenna system.

6. A modular RFID antenna system, comprising;

a plurality of modular antenna segments, each of said plurality of antenna segments adapted to transmit and receive at least one RF signal from at least one RF tag, said antenna segments being removably connectable to form a plurality of antenna system configurations, at least a first of said plurality of antenna system configurations providing a first antenna field, said first antenna field providing substantially multi-directional RF transmission and receipt of said RF signal; and configuration means, said configuration means including design means for designing at least a first one of said plurality of antenna system configurations, design validation means to validate said design of said first antenna system configuration, and configuration means for providing at least one assembly drawing and the control parameters for said first antenna system configuration, said configuration means including control means for controlling the operation of said first antenna system configuration after assembly.

7. The modular antenna system of claim 6, wherein said configuration means further includes test means for testing said assembled first antenna system configuration.

8. The modular antenna system of claim 7, wherein said configuration means includes memory means for storing at least a plurality of different said antenna segments, said plurality of antenna system configurations, and control parameters for said plurality of antenna system configurations.

* * * * *